No. 859,353. PATENTED JULY 9, 1907.
F. WACKERMANN.
HEADING MACHINE.
APPLICATION FILED AUG. 7, 1905.

5 SHEETS—SHEET 1.

Witnesses:
E. R. Rodd.
Chas. S. Sepley.

Inventor:
Frank Wackermann
by C. M. Clarke
his Attorney

No. 859,353. PATENTED JULY 9, 1907.
F. WACKERMANN.
HEADING MACHINE.
APPLICATION FILED AUG. 7, 1905.
5 SHEETS—SHEET 2.
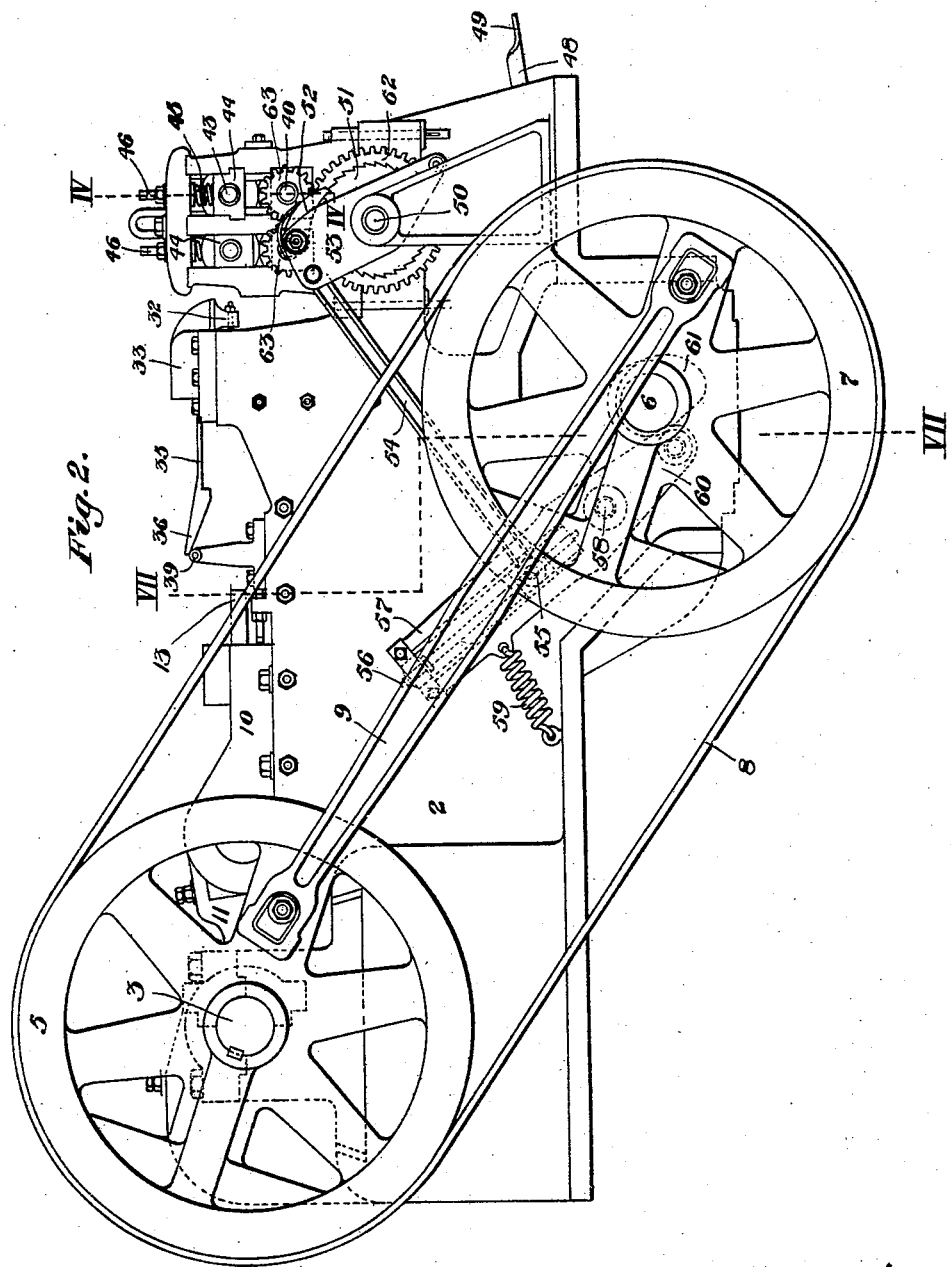
Witnesses:
E. R. Rodd.
Chas. S. Ripley
Inventor:
Frank Wackermann
by C. M. Clarke
his Attorney

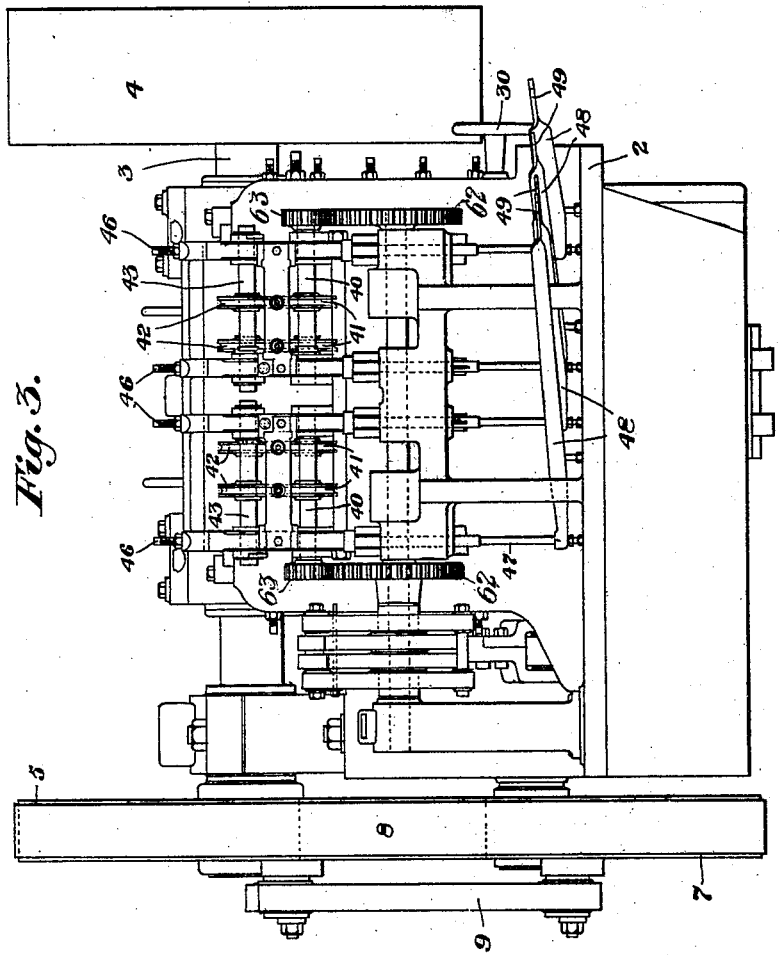

No. 859,359. PATENTED JULY 9, 1907.
F. WACKERMANN.
HEADING MACHINE.
APPLICATION FILED AUG. 7, 1905.
5 SHEETS—SHEET 4.
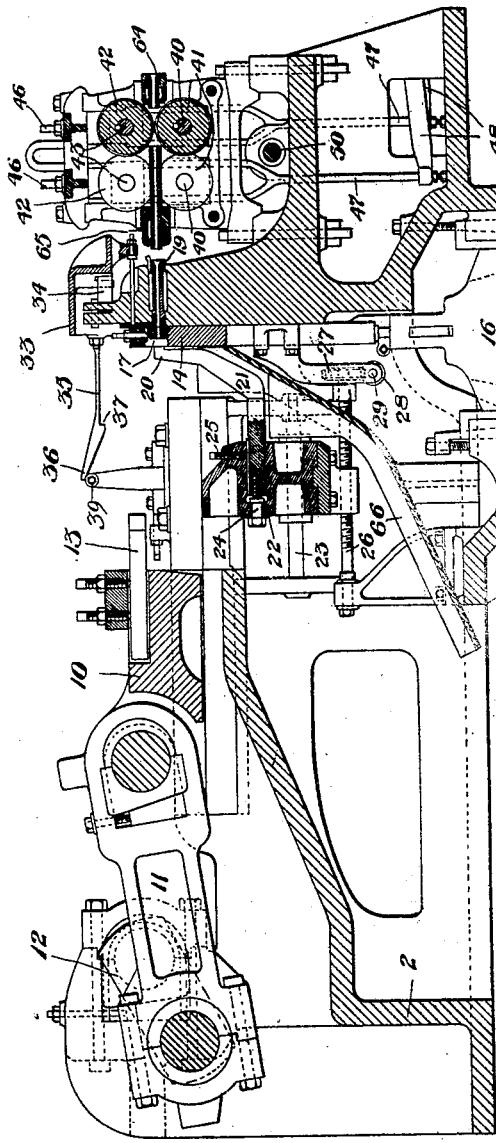
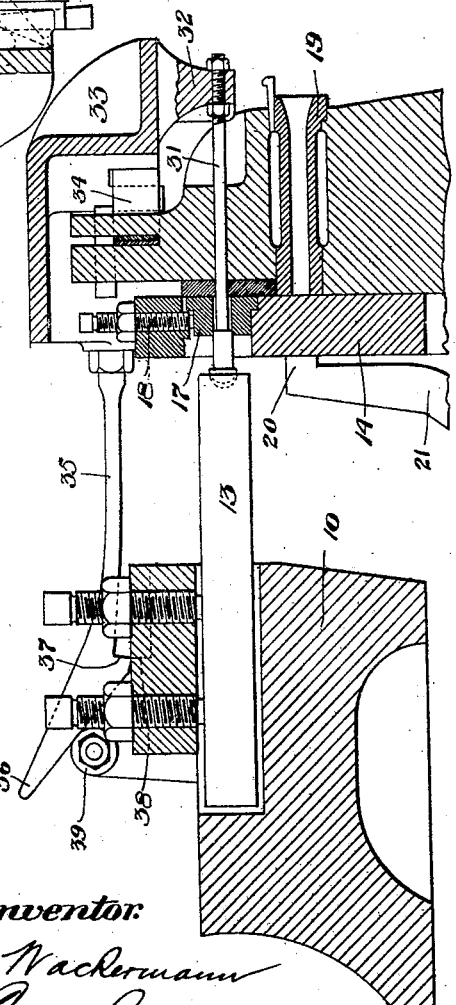
Witnesses:
E. R. Rodd.
Chas. S. Lepley
Inventor:
Frank Wackermann
by C. M. Clarke
his Attorney No. 859,353. PATENTED JULY 9, 1907.
F. WACKERMANN.
HEADING MACHINE.
APPLICATION FILED AUG. 7, 1905.

5 SHEETS—SHEET 5.

Witnesses:
E. R. Rodd.
Chas. S. Ripley.

Inventor:
Frank Wackermann
by C. M. Clarke
his Attorney

THE NORRIS PETERS CO., WASHINGTON, D. C.

UNITED STATES PATENT OFFICE.

FRANK WACKERMANN, OF CARRICK BOROUGH, PENNSYLVANIA, ASSIGNOR OF ONE-HALF TO PERCY E. HUNTER, OF ALLEGHENY, PENNSYLVANIA.

HEADING-MACHINE.

No. 859,353.  Specification of Letters Patent.  Patented July 9, 1907.

Application filed August 7, 1905. Serial No. 273,076.

*To all whom it may concern:*

Be it known that I, FRANK WACKERMANN, a citizen of the United States, residing at Carrick Borough, in the county of Allegheny and State of Pennsylvania, have invented certain new and useful Improvements in Heading-Machines, of which the following is a specification, reference being had therein to the accompanying drawing, forming part of the specification, in which—

Figure 1:
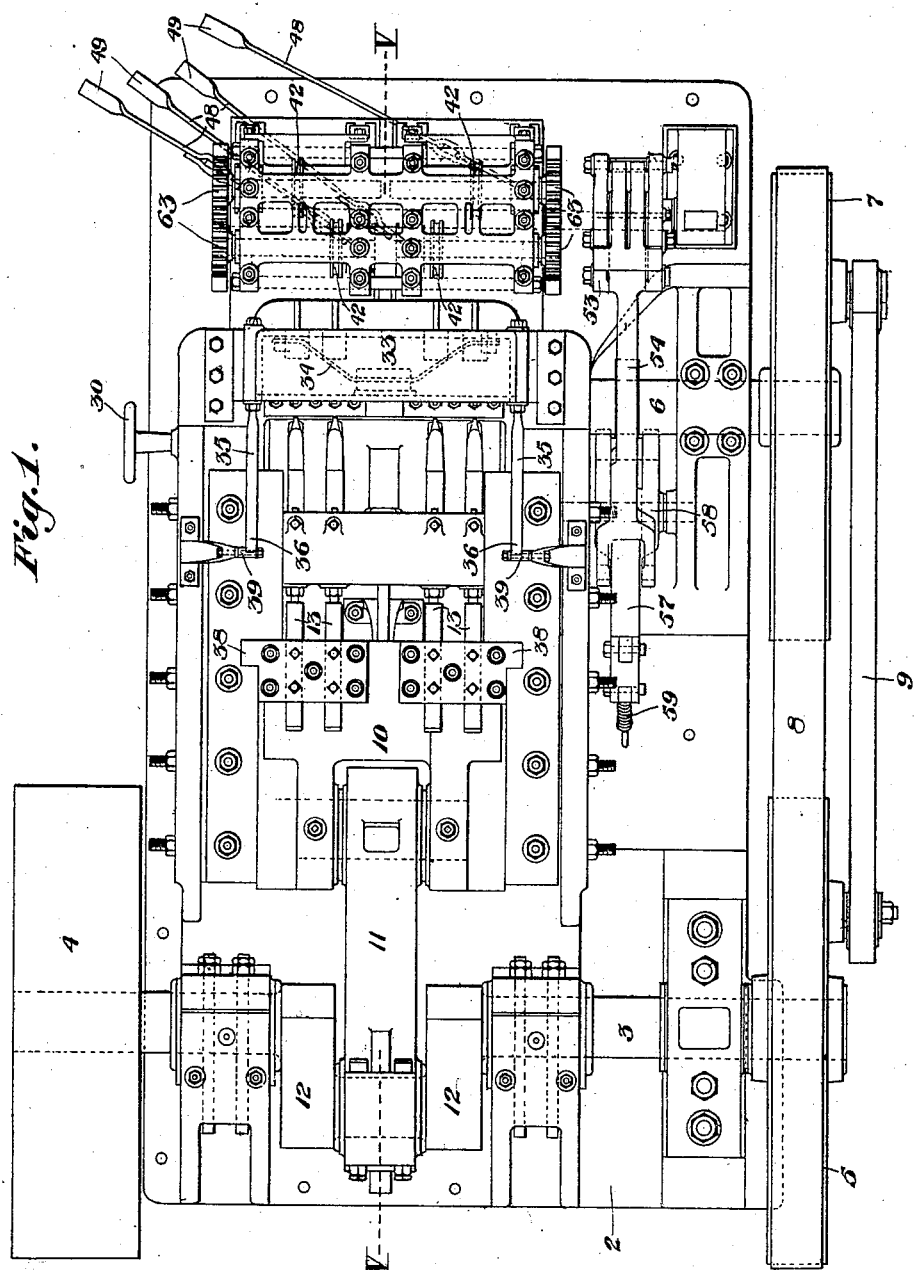
Figure 7:
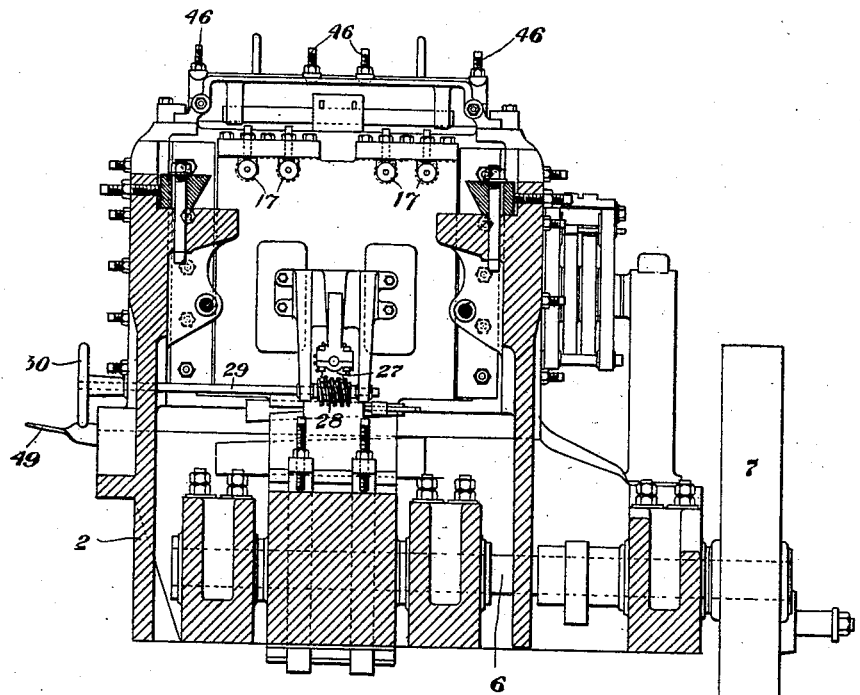
Figure 8:
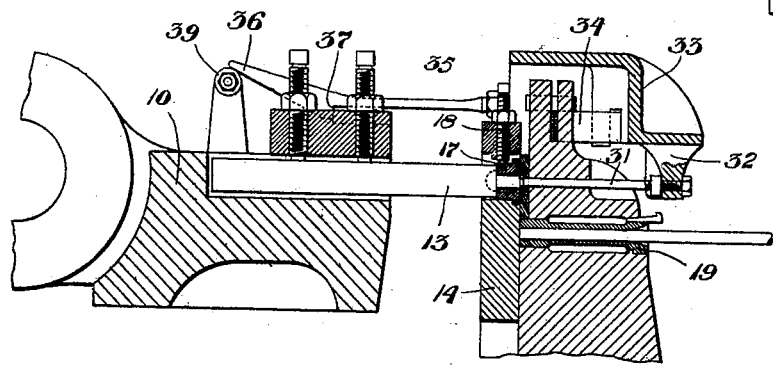

Figure 1. is a plan view of my improved multiple rivet and bolt machine. Fig. 2. is a view in side elevation thereof. Fig. 3. is an end view of the machine. Fig. 4. is an enlarged sectional detail view showing the supporting journals for the feed rolls, taken on the line IV. IV. of Fig. 2. Fig. 5. is a central longitudinal sectional view indicated by the line V. V. of Fig. 1. Fig. 6. is a partial similar view of the forward portion of the machine, on an enlarged scale, showing the header at the commencement of its backward travel after the heading operation, and illustrating the kicker mechanism. Fig. 7. is a vertical cross sectional view on the line VII. VII. of Fig. 2. Fig. 8. is a sectional view similar to Fig. 6, illustrating the operation of heading rivets.

My invention refers to improvements in heading machines for rivets, bolts, etc. and provides a machine of this character wherein a plurality of rivets, bolts or other forgings may be manufactured at the same time by a series of independently operating feed rollers and dies.

The invention refers to the construction whereby the successful operation of said feed rollers and dies is secured, together with mechanism for providing an adjustable gage for each set of dies, mechanism for ejecting the finished rivets, and various other features of improvement as shall be more fully hereinafter described.

Heretofore in apparatus of this kind wherein it has been endeavored to feed two or more blanks by means of feed rolls, the feed rolls have been mounted upon common shafts, and owing to the wear of the feed rollers, variations in gage of the blank, and other inequalities, it has been found that the feeding operation is not uniform.

In my invention I provide feeding rollers which are mounted on independent carrying spindles capable of co-operation with similar rollers, suitably driven and so arranged to feed a series of blanks through suitable guides to appropriate shearing and heading mechanism. A particular advantage of this construction is that it overcomes the disadvantage above noted while also being capable of independent adjustment or change without interfering with the other portions of the machine, or in fact without necessarily stopping its operation.

Referring now to the drawings, 2 represents the main frame of the machine provided at one end with a driving shaft 3 mounted in suitable bearings, driven at one end by belt-driven pulley 4 from any suitable source of power, the shaft 3 being provided at the other end with a similar driving pulley 5.

6 is a driven shaft located at the forward lower portion of the machine and mounted in suitable bearings, geared with pulley 5 through belt wheel 7, belt 8 and connecting rod 9, the belt 8 being auxiliary to the connecting rod and for the purpose of carrying the pulley 7 around its dead center.

10 is a cross-head mounted in suitable slideways arranged longitudinally of the machine as shown, and connected by actuating pitman 11 with the wrist pin of cranks 12, 12, incorporated with main shaft 3, by which mechanism the various heading dies 13, mounted in cross head 10, are reciprocated. These heading dies 13 are of any suitable form adapted to make the rivet or bolt heads and are removably secured in the cross-head and adjusted therein by any suitable means.

14 is a vertically movable die carrier arranged on the forward portion of the machine and vertically reciprocated by means of a cam 15 mounted on shaft 6 engaging yoke 16 of the die carrier, mounted in suitable sliding bearings, such mechanism being so arranged as to its position and stroke that it will support suitable shearing dies in line with the feed of the blank, and will at the proper time shift said dies upwardly, shear off the blank at suitable lengths, and bring the sheared blanks into alinement with the heading dies 13, and with the kicker pins by which the finished rivets are ejected. These motions and the time of their operation are provided for and controlled by the design of the cam 15, as will be readily understood. The die carrier 14 is provided with solid shearing dies 17 mounted in the upper portion of the carrier and suitably secured therein by set screws 18, while guides 19 lead from the feed rolls toward said shearing dies 17, with which guides the shearing dies aline in their lowermost stationary position, shown in Fig. 5.

At a suitable distance outwardly beyond the shearing dies and in alinement with the guides 19 are located the terminals 20 of limiting stops or gages 21, each of which is adjustably set in a gage carrier 22, slidingly mounted on rods 23 or other suitable supports. The gages 21 are accurately adjusted forwardly or backwardly, each one independently of the others, by means of a temper screw 24, a lock screw 25 also being provided to insure rigidity. The gage carrier 22 with all of the gages may be adjusted forwardly or backwardly by means of a temper screw 26, worm gearing 27, 28, shaft 29 and hand wheel 30 located at one side of the machine and within easy reach of the operator. By this mechanism each gage may be set to limit the desired length of rivet or bolt blank, and all of the gages may be retracted and advanced together for the purpose of adjustment. At the proper time the die carrier 14 is raised by cam 15 into alinement with headers 13, the blanks being held stationary in such heading position by means of the uniform radius portion of cam 15, during which time the headers 13 advance, form the head in the usual way and are then retracted by means of the crank 12. The finished rivets are then immediately ejected backwardly by kicker pins 31 extending backwardly through the front of the machine in suitable alinement, and adjustably mounted in depending carriers 32 of a longitudinally movable kicker pin carrier 33 extending across the front of the machine and mounted in suitable slides thereon. This carrier 33 is normally held outwardly so as to retain the pins in retracted position by means of power spring 34 and the carrier and pins are intermittently drawn backwardly at the proper time to eject the rivets by means of backwardly extending horns 35 provided with backwardly and upwardly tapering terminals 36 and locking shoulders 37. The cross head 10 is provided at each side with lugs or abutments 38 arranged to engage said shoulders 37 when at the forward limit of its travel, and to draw the carrier thereby backwardly sufficiently far to eject the finished rivets.

For the purpose of disengaging the horn terminals from said abutments 38 at the proper time, abutments or rollers 39 are located in the path of the tapered terminals 36, the under faces of which slope upwardly and forwardly, so that as the horns advance they will ride upwardly until engagement with the shoulders 37 has been released, whereupon the carrier 33 and its pins will be immediately retracted by means of power spring 34.

40, 40 are lower feed roller shafts mounted in suitable bearings located in the front portion of the machine, and carrying under feed rollers 41 arranged to aline with each of the blank positions leading forwardly to each separate die, and in suitable feeding relation with independent upper feed rollers 42, 42, the feed rollers being suitably grooved as will be readily understood to engage the blank. Each of the feed rollers 42 is mounted on a carrying spindle 43 mounted in bearing boxes 44 at each end, one of said boxes being pivoted as at $a$, the other of said boxes being pressed downwardly by spring 45 the pressure of which may be adjusted by temper screw 46. Each of said feed rollers 42 may be independently raised away from its under feeding roller 41 by means of a lifting frame 47 mounted on the inner end of lever 48, pivotally mounted and provided with a treadle extremity 49, a series of such treadle extremities corresponding in number to the feed rollers being provided. By this mechanism each of the feed rollers may be thrown out of contact with the blank at any desired time, and so held.

For the purpose of actuating the feed rollers I employ an intermittently actuated ratchet shaft 50 provided with ratchet wheel 51 engaged by one or more pawls 52 mounted in a suitable frame 53 and intermittently actuated by pitman 54. Pitman 54 extends backwardly and is adjustably mounted at 55 by means of a temper screw 56 in arm 57, pivoted to the main frame at 58 and normally retracted by spring 59. Arm 57 is provided with a terminal 60 extending beyond the pivotal bearing 58 provided with a roller or other bearing, and actuated at each revolution of shaft 6 by cam 61. By this mechanism the ratchet wheel 51 and shaft 50 are intermittently actuated. Motion is transmitted from shaft 50 to shafts 40 and under feed wheels 41 at the proper time by means of pinion 62 gearing into driven pinions 63, 63, on shafts 40, and it will be seen that the feed of said feed wheels may be very accurately controlled by the adjustment of the thrust of pinion 54 in the manner shown and described. For convenience of arrangement the pairs of feed rollers 41, 42, are staggered alternately as shown in Fig. 1, and for the purpose of facilitating the travel of the blank rod and suitably giuding it I preferably employ front and intermediate guides 64, 65, in alinement with guides 19.

By this construction it will be seen that any desired number of blanks, either one or more within the capacity of the machine, may be positively fed, sheared, headed and ejected by its own particular set of feed rollers, dies, etc. irrespective of the others, and such independent operation of the machine constitutes one of its principal features of improvement and advantage. The finished rivets or bolts fall downwardly through a trough 66 to any suitable receptacle.

The entire machine is very compact, rigid, capable of easy inspection, change or repair, and not liable to get out of order. Its capacity is very greatly increased over that of the ordinary single rivet or bolt machine, and it may be operated by a single attendant, thereby greatly reducing the cost of manufacture.

Changes or modifications may be made in its design, proportion or various other details of construction by the skilled mechanic, but all such changes are to be considered as within the scope of the following claims.

What I claim is:—

1. In a rivet heading machine the combination with a set of shearing dies and a set of heading dies and means to operate them all together, of independently operable pairs of feed rollers for each die, an adjustable stop head and several separately adjustable stops mounted on said head, each adapted to independently co-operate with one of said feeding devices, substantially as described.

2. In a rivet machine, the combination with an integral holding and shearing die block provided with a plurality of sockets, guiding devices leading thereto, means for actuating the holding and shearing block vertically to shear the blank, independent feeding rolls for each of said guiding devices and sockets and a horizontally adjustable gage carrier provided with a plurality of limiting stops or gages arranged for adjustment in alinement with said guiding devices, substantially as set forth.

3. In a rivet machine, the combination with an integral holding and shearing die block provided with a plurality of sockets, guiding devices leading thereto, means for actuating the holding and shearing block vertically to shear the blank, independent feeding rolls for each of said guiding devices and sockets and a horizontally adjustable gage carrier provided with a plurality of limiting stops or gages arranged for adjustment in alinement with said guiding devices, with means for independently adjusting and securing each of said limiting stops in said gage carrier, substantially as set forth.

4. In a rivet machine, the combination with a plurality of stationary guides, a vertically movable shearing and holding die having a horizontally arranged series of sockets adapted to aline therewith, means for actuating said shearing die vertically, and independently adjustable limiting devices for the stock arranged in alinement with the guides; of separate pairs of independently adjustable and independently operable feed rollers having grooves in alinement with and adapted to feed the stock independently to the guides, substantially as set forth.

5. In a rivet machine, the combination with a plurality of stationary guides, a vertically movable shearing and holding die having a horizontally arranged series of sockets adapted to aline therewith, means for actuating said shearing die vertically, and independently adjustable limiting devices for the stock arranged in alinement with the guides; of separate pairs of independently adjustable and independently operable feed rollers having grooves in alinement with and adapted to feed the stock independently to the guides, and means to independently vary the pressure on each pair of feed rollers, and to throw any single pair out of operation, substantially as set forth.

6. In a rivet machine, the combination with a plurality of stationary guides, a vertically movable shearing and holding die having a horizontally arranged series of sockets adapted to aline therewith, means for actuating said shearing die vertically, and independently adjustable limiting devices for the stock arranged in alinement with the guides; of separate pairs of independently adjustable and independently operable feed rollers having grooves in alinement with and adapted to feed the stock independently to the guides, means to independently vary the pressure on each pair of feed rollers, and to throw any single pair out of operation, said pairs of feeding rollers being arranged alternately in staggered relation to each other, and supplemental guides arranged between the most remote of said pairs of feeding rollers and said first named guides, substantially as set forth.

7. The combination with a plate having a horizontal feed orifice, of a stop and a vertically movable shear and die block having a socket registering therewith and adapted to shear off and hold a fixed length of stock therein filling the socket, a perforate matrix die having an opening smaller than the stock, and a heading die with means to move it horizontally in line with the matrix and the shearing block after the latter has moved, and an ejector working through said matrix die.

8. In a heading machine the combination with a plate having a series of feed openings, of shearing dies and heading dies, and a series of independently adjustable feed rollers and stops to limit the length of the blank introduced in each opening, a supporting head for the stops also itself adjustable, and independently adjustable feeding devices for each opening, substantially as described.

9. In a heading machine, the combination with a series of shearing dies, and independently operable means for feeding the blanks thereinto, of an adjustable gage carrier provided with independently adjustable gages thereon for each of said dies, substantially as set forth.

10. In a heading machine, the combination with a plurality of horizontally arranged vertically movable shearing dies and feeding openings for the blank, of perforated heading matrixes; a carrier provided with a corresponding series of ejector pins operable through the matrixes, means for retracting said carrier, a horizontally movable cross-head provided with a series of header dies, means for connecting said carrier with said cross head to move it, and means for dis-connecting the carrier therefrom, substantially as set forth.

11. In a heading machine, the combination with a plurality of horizontally arranged vertically movable shearing dies and feeding openings for the blank, of perforated heading matrixes and a carrier provided with a corresponding series of ejector pins operating therethrough, a horizontally movable cross-head provided with a series of header dies, a shouldered horn mounted on said carrier to move it by engaging said cross head and provided with a tapering extremity, and a stationary abutment arranged to engage said tapering extremity to disconnect the horn from the cross-head, substantially as set forth.

In testimony whereof I affix my signature in presence of two witnesses.

FRANK WACKERMANN.

Witnesses:
C. M. CLARKE,
CHAS. S. LEPLEY.